(12) United States Patent
Loignon et al.

(10) Patent No.: US 9,666,889 B2
(45) Date of Patent: May 30, 2017

(54) AIRCRAFT GROUND SUPPORT VEHICLE

(71) Applicant: Parker-Hannifin Corporation, Cleveland, OH (US)

(72) Inventors: Michel Loignon, Laguna Beach, CA (US); Scott Brierley, Carlsbad, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 35 days.

(21) Appl. No.: 14/662,543

(22) Filed: Mar. 19, 2015

(65) Prior Publication Data

US 2015/0274323 A1 Oct. 1, 2015

Related U.S. Application Data

(60) Provisional application No. 61/969,944, filed on Mar. 25, 2014.

(51) Int. Cl.
*H01M 8/04828* (2016.01)
*B60L 1/00* (2006.01)
(Continued)

(52) U.S. Cl.
CPC ......... *H01M 8/04947* (2013.01); *B60L 1/003* (2013.01); *B60L 1/006* (2013.01); *B60L 11/1805* (2013.01); *B60L 11/1887* (2013.01); *B64F 1/225* (2013.01); *H01M 8/0494* (2013.01); *H01M 8/04776* (2013.01);
(Continued)

(58) Field of Classification Search
CPC .......... B60L 1/003; B60L 1/006; B60L 11/18; B60L 11/1859; B60K 6/46; B60K 6/28
See application file for complete search history.

(56) References Cited

U.S. PATENT DOCUMENTS 6,326,763 B1 * 12/2001 King ................. H01M 8/04298
320/101
6,973,880 B2 * 12/2005 Kumar ..................... B60L 7/12
105/35

(Continued)

FOREIGN PATENT DOCUMENTS

WO WO 2004/028903 4/2004
WO WO 2011/066891 6/2011

*Primary Examiner* — Hau Phan
(74) *Attorney, Agent, or Firm* — Renner, Otto, Boisselle & Sklar, LLP

(57) ABSTRACT

Provided is a power management system of an aircraft ground support vehicle. The power management system includes a power production control module in communication with a fuel cell system of the aircraft ground support vehicle to control production of electrical power by the fuel cell system. The fuel cell system may be configured as a sole source of power to directly power a traction system of the aircraft ground support vehicle and to provide electrical power to an auxiliary power output of the aircraft ground support vehicle. The power management system further includes a power distribution control module in communication with the fuel cell system to control distribution of the electrical power between the traction system and the auxiliary power output. The aircraft ground support vehicle may include a chassis, the traction system, the auxiliary power output, the fuel cell system, and the power management system.

20 Claims, 2 Drawing Sheets

(51) Int. Cl.
  *H01M 8/04858* (2016.01)
  *H01M 8/04746* (2016.01)
  *B60L 11/18* (2006.01)
  *B64F 1/22* (2006.01)

(52) U.S. Cl.
  CPC ..... *H01M 8/04925* (2013.01); *B60L 2200/40* (2013.01); *B60L 2220/46* (2013.01); *B60L 2260/28* (2013.01); *H01M 2250/20* (2013.01); *Y02T 90/16* (2013.01); *Y02T 90/32* (2013.01); *Y02T 90/34* (2013.01)

(56) References Cited

U.S. PATENT DOCUMENTS

| | | | | |
|---|---|---|---|---|
| 7,137,344 B2* | 11/2006 | Kumar | ............. | B60K 6/46 105/35 |
| 7,185,591 B2* | 3/2007 | Kumar | ............. | B60K 6/28 105/35 |
| 7,291,934 B2* | 11/2007 | Bernardi | ............. | B60K 6/46 123/41.01 |
| 7,439,634 B2* | 10/2008 | Michalko | ............. | H02J 4/00 307/43 |
| 7,448,328 B2* | 11/2008 | Kumar | ............. | B60K 6/46 105/35 |
| 7,923,862 B2* | 4/2011 | Cardinal | ............. | G05F 1/70 307/57 |
| 8,600,590 B2* | 12/2013 | Frazier | ............. | B61C 3/00 105/27 |
| 8,602,141 B2* | 12/2013 | Yee | ............. | B60L 11/1859 180/65.21 |
| 8,738,268 B2* | 5/2014 | Karimi | ............. | H02J 3/38 244/53 R |
| 2004/0018399 A1* | 1/2004 | Jung | ............. | B60L 11/1881 429/9 |
| 2005/0228553 A1* | 10/2005 | Tryon | ............. | B60K 6/46 701/22 |
| 2006/0005736 A1* | 1/2006 | Kumar | ............. | B60L 11/1801 105/1.4 |
| 2007/0161455 A1* | 7/2007 | King | ............. | B60K 6/26 477/3 |
| 2008/0218104 A1* | 9/2008 | Lukic | ............. | B60L 11/005 318/139 |
| 2008/0246436 A1* | 10/2008 | Fischer | ............. | B60K 6/46 320/124 |
| 2009/0008167 A1* | 1/2009 | Aoyagi | ............. | B60H 1/00392 180/65.31 |

* cited by examiner

AIRCRAFT GROUND SUPPORT VEHICLE

RELATED APPLICATION

This application claims the benefit of U.S. Provisional Application No. 61/969,944 filed Mar. 25, 2014, the disclosure of which is incorporated herein by reference in its entirety.

FIELD OF INVENTION

The present invention relates generally to an aircraft ground support vehicle, and more particularly to a fuel cell powered aircraft ground support vehicle for performing ground-based aircraft movement and for providing the aircraft with auxiliary power.

BACKGROUND

Aircraft ground support vehicles are frequently used to perform aircraft-related ground support operations at airports around the world. For example, aircraft ground support vehicles may move the aircraft for purposes of pre-taxi and/or post-taxi movement, gate pushback, and maintenance positioning. Aircraft ground support vehicles may also be called upon to deliver a source of auxiliary power to the aircraft, which is conventionally performed by towing a separate power cart to the location of the aircraft and connecting the power cart to the aircraft.

Performing these ground support operations simultaneously in a conventional manner using a single aircraft ground support vehicle is neither safe nor practical, as this would require movement of the aircraft while also towing the power cart. As a result, a single aircraft ground support vehicle will either perform these tasks sequentially, or multiple aircraft ground support vehicles will be used to respectively perform these tasks. The first situation increases the time required to perform the ground support operations. The second situation doubles the number ground support vehicles needed to accomplish the ground support operations, which may draw resources away from other tasks. Both situations can impact aircraft schedules and maintenance activities.

SUMMARY OF INVENTION

The present invention provides a power management system of an aircraft ground support vehicle. The power management system includes a power production control module in communication with a fuel cell system of the aircraft ground support vehicle to control production of electrical power by the fuel cell system. The fuel cell system may be configured as a sole source of power to directly power a traction system of the aircraft ground support vehicle and to provide electrical power to an auxiliary power output of the aircraft ground support vehicle. The power management system further includes a power distribution control module in communication with the fuel cell system to control distribution of the electrical power between the traction system and the auxiliary power output. The aircraft ground support vehicle may include a chassis, the traction system, the auxiliary power output, the fuel cell system, and the power management system.

According to one aspect of the invention, an aircraft ground support vehicle includes a chassis, a traction system, an auxiliary power output, a fuel cell system, and a power management system. The traction system is mounted to the chassis and configured to drive the aircraft ground support vehicle. The auxiliary power output is configured to couple to an auxiliary power input of an aircraft. The fuel cell system is fixedly mounted to the chassis and is configured as a sole source of power to directly power the traction system and the auxiliary power output. The power management system is configured to control production of electrical power by the fuel cell system and to control distribution of the electrical power between the traction system and the auxiliary power output.

The power management system may be configured to simultaneously distribute the electrical power produced by the fuel cell system between the traction system and the auxiliary power output.

The power management system may include a power production control module configured to control production of electrical power by the fuel cell system in response to one or more power control input signals received from an operator input or from the auxiliary power output.

The power management system may include a power distribution control module configured to distribute the electrical power produced by the fuel cell system to the traction system and to the auxiliary power output in response to one or more power control input signals received from an operator input or from the auxiliary power output.

The fuel cell system may include fuel cells combined in series and in parallel circuits.

The aircraft ground support vehicle may further include a fuel source configured to supply fuel to the fuel cell system.

The fuel source may include a reformer configured to convert a hydrocarbon reactant to a fuel for use by the fuel cell system.

The power management system may be further configured to control production of the fuel by the reformer.

The auxiliary power output may be configured to vary a voltage of electrical power output therefrom.

The aircraft ground support vehicle may further include a reclamation system configured to capture waste products from the fuel cell system.

The traction system may include one or more wheels mounted to the chassis and one or more electric motors configured to drive the one or more wheels.

According to another aspect of the invention, a power management system of an aircraft ground support vehicle includes a power production control module and a power distribution control module. The power production control module is in communication with a fuel cell system of the aircraft ground support vehicle to control production of electrical power by the fuel cell system, the fuel cell system configured as a sole source of power to directly power a traction system of the aircraft ground support vehicle and provide electrical power to an auxiliary power output of the aircraft ground support vehicle. The power distribution control module is in communication with the fuel cell system to control distribution of the electrical power between the traction system and the auxiliary power output.

The power management system may be configured to simultaneously distribute the electrical power produced by the fuel cell system between the traction system and the auxiliary power output.

The power production control module may be configured to control production of electrical power by the fuel cell system in response to one or more power control input signals received from an operator input or from the auxiliary power output.

The power distribution control module may be configured to distribute the electrical power produced by the fuel cell system to the traction system and to the auxiliary power output in response to one or more power control input signals received from an operator input or from the auxiliary power output.

The power production control module may be in communication with a fuel source of the aircraft ground support vehicle, the fuel source comprising a reformer configured to convert a hydrocarbon reactant to a fuel for use by the fuel cell system, and the power production control module may be configured to control production of the fuel by the reformer.

According to yet another aspect of the invention, a method of managing electrical power of an aircraft ground support vehicle includes producing electrical power with a fuel cell system of the aircraft ground support vehicle, the fuel cell system configured as a sole source of power to directly power a traction system of the aircraft ground support vehicle and provide electrical power to an auxiliary power output of the aircraft ground support vehicle; and distributing the electrical power between the traction system and the auxiliary power output.

The electrical power produced by the fuel cell system may be simultaneously distributed between the traction system and the auxiliary power output.

The production of electrical power by the fuel cell system may be controlled in response to one or more power control input signals received from an operator input or from the auxiliary power output.

The distribution of the electrical power produced by the fuel cell system to the traction system and to the auxiliary power output may be controlled in response to one or more power control input signals received from an operator input or from the auxiliary power output.

The method may further include converting a hydrocarbon reactant to a fuel for use by the fuel cell system using a reformer of the aircraft ground support vehicle.

The foregoing and other features of the invention are hereinafter described in greater detail with reference to the accompanying drawings.

DETAILED DESCRIPTION

The principles of the present application have particular application to aircraft ground support vehicles, and thus will be described below chiefly in this context. It will of course be appreciated, and also understood, that the principles of the invention may be useful for other applications where management of electrical power between a traction system and an auxiliary power output is desired.

Figure 1:
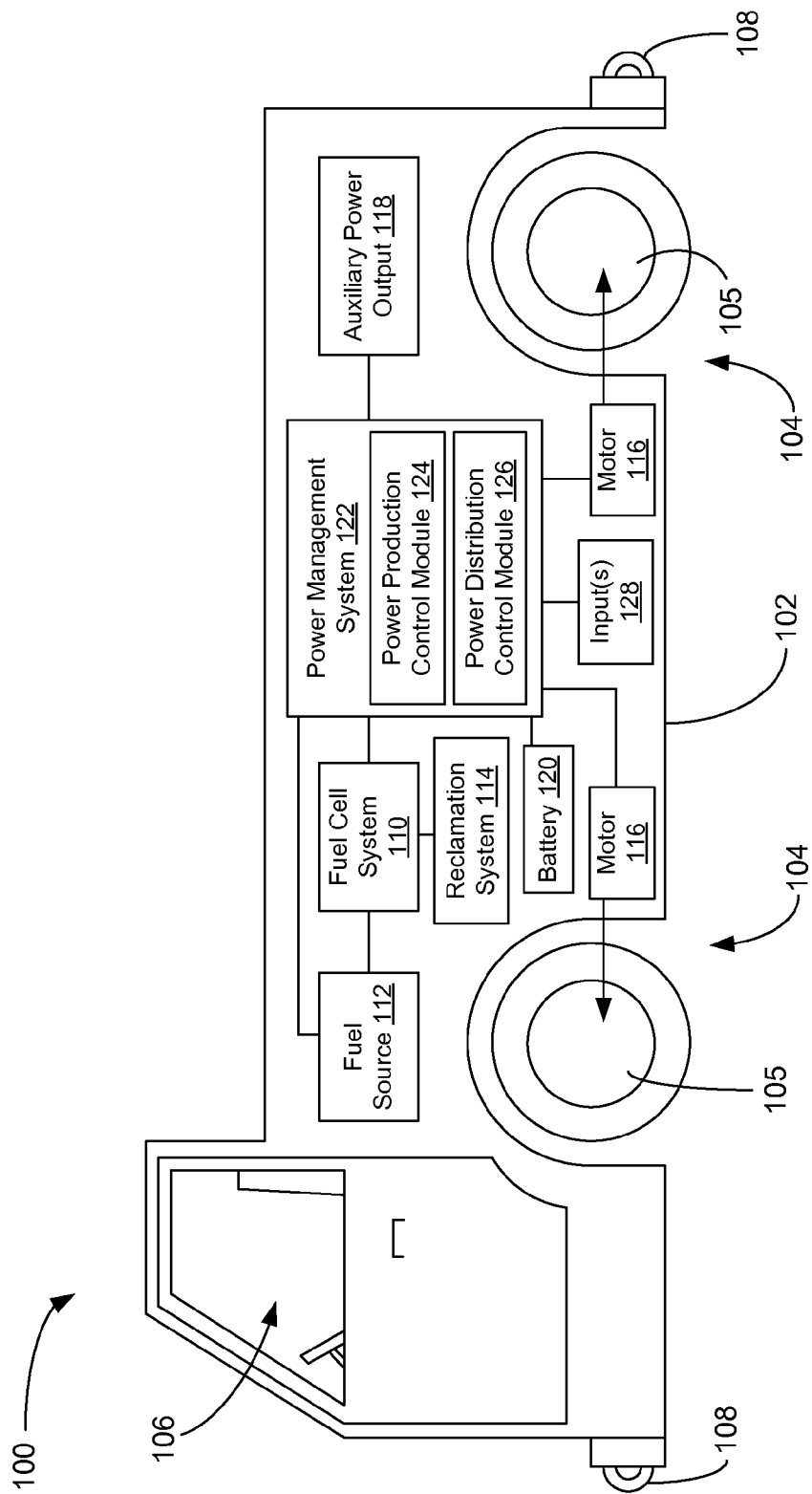
FIG. 1 is a schematic diagram of an exemplary aircraft ground support vehicle.

Referring now in detail to the drawings and initially to FIG. 1, an exemplary aircraft ground support vehicle is shown at 100. The aircraft ground support vehicle 100 is embodied as an aircraft tractor configured to move an aircraft. The specific design of the aircraft ground support vehicle 100 is not limited in the context of the present disclosure. Only certain features of the aircraft ground support vehicle 100 are specifically described herein, while other features of the aircraft ground support vehicle 100 are not described in detail. It should be noted that the overall design of the aircraft ground support vehicle 100 (e.g., the weight of the aircraft ground support vehicle, the height of the aircraft ground support vehicle, one or more dimensions of the aircraft ground support vehicle, the position from which the operator controls the aircraft ground support vehicle, etc.) may be dictated, at least in part, by the specific application of the aircraft ground support vehicle 100. For example, the aircraft ground support vehicle may have a low profile design to fit under the nose of a specific model of aircraft.

The aircraft ground support vehicle includes a chassis 102. The chassis 102 may serve as a platform on which various components of the aircraft ground support vehicle 100 may be supported and/or mounted. As an example, a traction system 104 may be mounted to the chassis 102. The traction system 104 may be embodied as an electrically-powered traction system configured to drive the aircraft ground support vehicle 100. In the exemplary embodiment shown, the traction system 104 includes one or more wheels 105 mounted to the chassis 102 of the aircraft ground support vehicle 100. The traction system 104 further includes one or more electric motors 116 configured to drive the one or more wheels 105. As described in more detail below, the one or more electric motors 116 may be powered by electrical power from a fuel cell system 110. The wheels shown in the exemplary embodiment are mounted with tires (e.g., solid or inflatable tires) that may provide traction when driving the aircraft ground support vehicle 100. Although not specifically shown, in other embodiments, the one or more wheels 105 of the aircraft ground support vehicle 100 may be mounted with one or more continuous tracks. Each continuous track may be, for example, a rubber-covered metal structure. The implementation of tires and/or tracks may depend on the particular application of the aircraft ground support vehicle 100.

The aircraft ground support vehicle 100 may include an operator control position 106 from which the operator may operate the aircraft ground support vehicle 100. The operator control position 106 may include one or more operator inputs 128 for controlling operation of the aircraft ground support vehicle 100. The one or more inputs 128 may be located in the proximity of the operator control position 106 for allowing an operator to input control commands regarding the driving of the aircraft ground support vehicle 100, distribution of electrical power, and the like. For example, an operator may drive the aircraft ground support vehicle 100 using a steering wheel, accelerator, and brake located at the operator control position 106. The operator may control the supply/distribution of electrical power using one or more operation buttons or switches (e.g., embodied as a part of a control panel at the operator control position 106). In the example shown, the control position 106 is located toward the front of the vehicle. In other examples, the control position 106 may be located toward the middle or toward the rear of the vehicle. In other embodiments, the vehicle may not include a control position. For example, the aircraft ground support vehicle 100 may be remotely controlled by the operator, and/or the aircraft ground support vehicle 100 may be automated. While the one or more inputs 128 may be located in the proximity of the operator control position 106, in some embodiments, the one or more inputs 128 may be located elsewhere on the aircraft ground support vehicle 100 and/or remote from the aircraft ground support vehicle 100.

The aircraft ground support vehicle 100 may be embodied to move an aircraft using a tow bar. Accordingly, in some embodiments, the aircraft ground support vehicle 100 may include one or more tow hitches 108 mounted to the chassis 102. In the example shown, the aircraft ground support vehicle 100 includes a tow hitch 108 at the front of the vehicle, as well as a tow hitch 108 at the rear of the vehicle. A tow bar may be used to connect the hitch 108 of the aircraft ground support vehicle 100 to the nose landing gear of the aircraft. In other embodiments, the aircraft ground support vehicle 100 may be embodied to move an aircraft without the use of a tow bar (e.g., a tow bar-less type of aircraft tractor). As such, the aircraft ground support vehicle 100 may include hardware (not shown) that is configured to lift up and support the nose wheel of the aircraft off the ground, allowing the aircraft ground support vehicle 100 to maneuver the aircraft while the nose wheel is supported.

The aircraft ground support vehicle 100 includes a fuel cell system 110 mounted to the chassis 102. The fuel cell system is configured to convert chemical energy from a fuel (e.g., hydrogen) into electricity through a chemical reaction with oxygen or another oxidizing agent. As discussed in more detail below, the electrical power provided by the fuel cell system 110 may be used to directly power the traction system 104 (e.g., by powering the one or more electric motors 116). The electrical power provided by the fuel cell system 110 may also be provided to an auxiliary power output 118 for providing auxiliary power to an aircraft. The fuel cell system 110 may be the sole source of power for powering the traction system and providing electrical power to the auxiliary power output.

Although not specifically shown, the fuel cell system 110 may include one or more fuel cells (not shown). Fuel cells utilized in the fuel cell system 110 may be combined in series and in parallel circuits. Placing the fuel cells in series may increase the voltage provided by the fuel cell system 110, and providing parallel-channel configurations of the fuel cells 110 may increase the current. This arrangement of fuel cells may also be referred to as a "fuel cell stack." The particular number and arrangement of fuel cells utilized in the fuel cell system may depend on the particular application of the aircraft ground support vehicle 100, and may be based, at least in part, on the power requirements of the aircraft ground support vehicle 100 itself, as well as power requirements of the aircraft to which auxiliary power is to be provided. As an example, operation of the aircraft ground support vehicle 100 may utilize from about 100 kW to about 200 kW. Auxiliary electrical power for the aircraft may utilize from about 50 kW to about 150 kW. Accordingly, in some embodiments, the fuel cell system 110 may be configured to output from about 150 kW to about 350 kW of electrical power.

The fuel cells included in the fuel cell system 110 may be any suitable type of fuel cell. In general, a fuel cell consists of an anode, a cathode, and an electrolyte. At the anode, a catalyst oxidizes the fuel (e.g., hydrogen) turning the fuel into positively charged ions and negatively charged electrons. The ions pass through the electrolyte toward the cathode, but the electrolyte does not allow for passage of the electrons. The freed electrons therefore travel through an external circuit (e.g., included as a part of the fuel cell system) that couples the anode and the cathode, thereby creating electric current. Upon reaching the cathode, the ions are reunited with the electrons and the two react in the presence of a cathode catalyst with a third component (e.g., oxygen/air), to create water and/or carbon dioxide. Examples of suitable fuel cells include proton exchange membrane fuel cells, alkaline fuel cells, high-temperature fuel cells such as solid oxide fuel cells and molten carbonate fuel cells, phosphoric acid fuel cells, and the like.

The fuel cell system 110 may include one or more other components to facilitate fuel cell operation. In some embodiments, the fuel cell system 110 may include one or more heating elements, heat exchangers, and/or fans to control the temperature of the one or more fuel cells. In other embodiments, as described above, the fuel cell system 110 may include circuitry to facilitate the flow of current and generation of electrical power.

The aircraft ground support vehicle 100 includes a fuel source 112 configured to supply fuel to the fuel cell system 110. In some embodiments, the fuel source includes a source of fuel that may be directly input to the fuel cell system. For example, depending on the specific type of fuel cells used in the fuel cell system 110, the fuel source may include hydrogen (e.g., compressed hydrogen), an alcohol such as ethanol or methanol, and the like. In other embodiments, the fuel source may include a source of hydrocarbon reactant (e.g., natural gas, alcohols, jet fuel such as Jet A or Jet A-1, aviation gasoline, diesel, etc.) and a reformer for converting the hydrocarbon reactant to hydrogen for use by the fuel cell system. The hydrogen produced by the reformer may be directly supplied to the fuel cell system. Alternatively, the hydrogen produced by the reformer may be temporarily stored at the fuel source and provided to the fuel cell system as needed. The source of fuel or the source of hydrocarbon reactant may be replenished periodically (e.g., by way of a refueling station).

The aircraft ground support vehicle 100 may include a reclamation system 114 configured to capture waste products from the fuel cell system 110. Depending on the specific type of fuel cells used in the fuel cell system, waste products from the fuel cell system may include water and/or $CO_2$. Accordingly, in some embodiments, the reclamation system 114 may include a receptacle for retaining water produced by the fuel cell system. In other embodiments, the reclamation system 114 may include a receptacle for retaining $CO_2$ produced by the fuel cell system. In other embodiments, the aircraft ground support vehicle 100 may not include a reclamation system, and the waste products (e.g., water and/or $CO_2$) of the fuel cell system may be discharged into the environment.

Use of a fuel cell system to directly power the aircraft ground support vehicle 100 in its various operations provides advantages over battery powered electric aircraft ground support vehicles. For example, the fuel cell system may provide on-demand power without concern regarding battery life. The life of a fuel cell is, at least in theory, unlimited since the fuel cell only requires the fuel supply to be replenished periodically. Furthermore, because most hydrogen fuel cells produce water as a waste product, the use of these fuel cells results in fewer environmental concerns than batteries, which typically contain heavy metals and acids.

The aircraft ground support vehicle 100 includes one or more electric motors 116. The one or more electric motors 116 may be embodied as a part of the traction system 104 and may be configured to drive the one or more wheels 105. The one or more electric motors 116 may be directly powered using electrical power from the fuel cell system 110.

The aircraft ground support vehicle 100 includes an auxiliary power output 118 for providing auxiliary power to an aircraft. More specifically, the auxiliary power output 118 may be configured to couple to an auxiliary power input (not shown) of the aircraft and provide electrical power from the fuel cell system 110. The auxiliary power output 118 may include one or more cables and/or couplers suitable for connecting to the aircraft. The one or more couplers may have any suitable configuration, and may include a breakaway mechanism for safety purposes. In some embodiments, the auxiliary power output system 118 may be configured to convert the electric current from DC to AC. In such embodiments, the auxiliary power output 118 may include power electronics such as an inverter.

In some embodiments, the auxiliary power output 118 may be configured to vary the voltage of the electrical power provided to the aircraft. As such, the auxiliary power output 118 may be considered a variable voltage auxiliary power output 118. It is conceivable that the aircraft ground support vehicle 100 may interact with various types of aircraft (and with various systems for a given aircraft), and that the voltage requirements for such aircrafts (as well as specific systems within a given aircraft) may vary. Accordingly, the auxiliary power output 118 may be configured to supply one or more suitable voltages. In embodiments where more than one voltage is supplied, these voltages may be supplied contemporaneously (e.g., via separate cables and/or couplers). Exemplary voltages include 28 VDC, 115 VAC, +/−270 VDC (high-voltage DC), and the like. The specific voltage or voltages supplied by the auxiliary power output 118 may be selected by the operator (e.g., using one or more inputs 128), or the auxiliary power output 118 may automatically adjust the voltage or voltages in response to coupling with the auxiliary power input of the aircraft and communicating with the aircraft. The auxiliary power output 118 may include power electronics suitable for supplying the appropriate voltage or voltages.

Electrical power from the fuel cell system 110 may be provided to the auxiliary power output 118. In some embodiments, as described below, the auxiliary power output 118 may include a sensor for sensing a connected/disconnected state of the auxiliary power output 118 to an auxiliary power input of the aircraft. A signal produced by the sensor may be used as a control signal to control whether or not electrical power is provided to the auxiliary power output.

As described above, the fuel cell system may be the sole source of power for powering the traction system 104 and for providing electrical power to the auxiliary power output 118. The aircraft ground support vehicle 100 may include a battery 120, but the battery 120 may not provide electrical power for powering the traction system and providing electrical power to the auxiliary power output. For example, the battery 120 may be used to provide support power to the fuel cell system upon startup or during operation for purposes of heating or cooling the fuel cell. In another example, the battery 120 may be used to provide accessory power for performing various control operations. Hence, in embodiments where a battery is included, the battery may serve as a secondary power source that is not used in connection with powering the traction system 104 and providing electrical power to the auxiliary power output 118. In some embodiments, however, the battery 120 may provide supplemental power for powering the traction system 104 and providing electrical power to the auxiliary power output 118. In any of the above-described embodiments, the battery 120 may be charged by the fuel cell system 110.

Operation of the fuel cell system 110 and management of the electrical power produced by the fuel cell system 110 may be controlled by a power management system 122. As described in greater detail below, the power management system 122 may distribute electrical power produced by the fuel cell system 110 among the traction system 104 and the auxiliary power output 118 (e.g., via the power distribution control module 126). Accordingly, the power management system 122 may enable the aircraft ground support vehicle 100 to independently or simultaneously move an aircraft and provide the aircraft with ground-based electrical power by relying on a single integrated fuel cell system.

The power management system 122 may include a power production control module 124. The power production control module 124 may be configured to control production of electrical power by the fuel cell system 110. The power production control module 124 may be configured to send an instruction to the fuel cell system 110 to initiate, adjust, or end production of electrical power. This may be accomplished, for example, by controlling the supply of reactants at the fuel cell system 110. The power production control module 124 may control production of electrical power by the fuel cell system in response to one or more power control input signals received as a result of user operation of one or more inputs 128 and/or in response to one or more power control input signals received from the auxiliary power output 118.

In embodiments where the fuel source 112 includes a reformer for converting the hydrocarbon reactant to hydrogen for use by the fuel cell system 110, the power production control module 124 may also be configured to control production of hydrogen by the reformer. For example, the power production control module 124 may control the reformer to convert the hydrocarbon reactant to a source of hydrogen at a rate that is suitable to sustain the chemical reaction in the fuel cells of the fuel cell system 110.

The power management system 122 may include a power distribution control module 126. The power distribution control module 126 may be configured to control the distribution of electrical power to the traction system 104 (e.g., to the one or more motors 116 for driving the aircraft ground support vehicle 100) and to the auxiliary power output 118 (e.g., for providing auxiliary power to an aircraft). The power distribution control module 126 may be configured to simultaneously provide electrical power to the traction system 104 and to the auxiliary power output system 118. The amount and proportion of electrical power provided to the traction system 104 and/or to the auxiliary power output 118 may be controlled based on operator input and/or on a signal provided by the auxiliary power output 118.

The power production control module 124 and/or the power distribution control module 126 (e.g., the power management system 122) may be embodied as one or more dedicated hardware components (e.g., power electronics), as are generally known by those of ordinary skill in the art. In other embodiments, the power production control module 124 and/or the power distribution control module 126 may at least in part be embodied in the form of executable logic routines (e.g., lines of code, software programs, etc.) that are stored on a non-transitory computer readable medium (e.g., a memory, not shown) and are executed by a processing device (not shown) of the aircraft ground support vehicle 100. In such embodiments, such functionality may be carried out via some combination of hardware, firmware and/or software.

Figure 2:
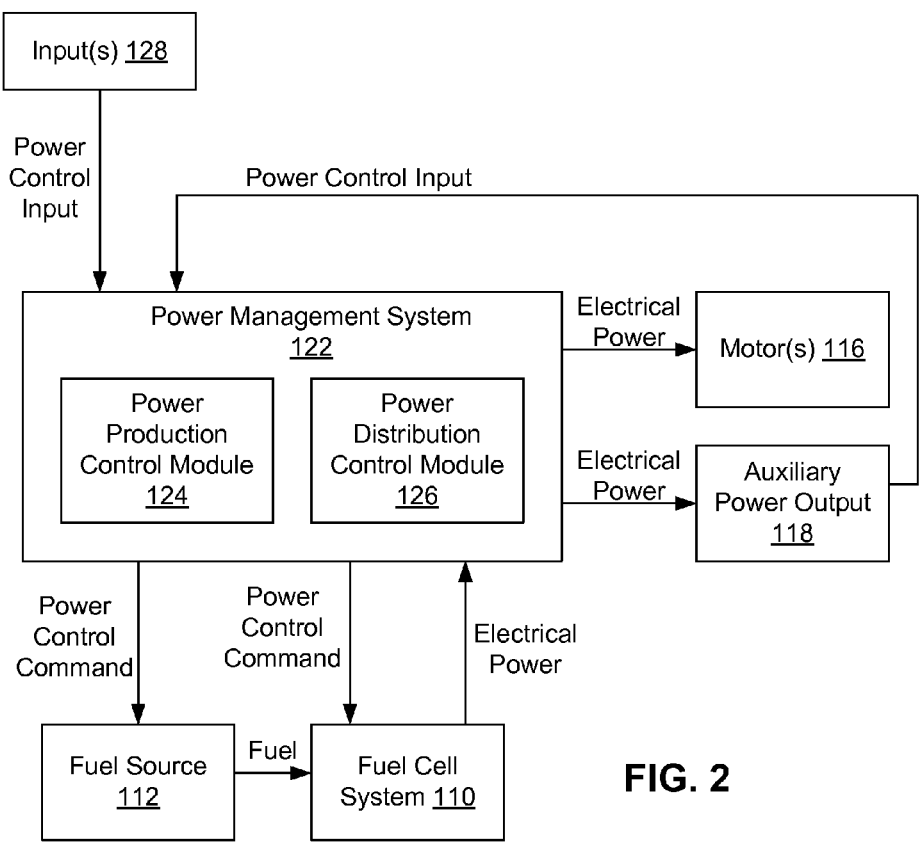
FIG. 2 is a schematic diagram of parts of the exemplary aircraft ground support vehicle.

Exemplary operation of the fuel cell system 110 and management of the electrical power produced by the fuel cell system 110 will now be described with reference to FIG. 2. FIG. 2 schematically shows interaction among components of the aircraft ground support vehicle.

As shown, the power management system 122 may receive one or more power control inputs. In some embodiments, the one or more power control inputs may include an operator-based input received from the one or more inputs 128. In an example, the operator may press or depress the accelerator of the aircraft ground support vehicle 100 to accelerate or slow the vehicle. In another example, the operator may press a button or throw a switch associated with the auxiliary power output 118 to initiate or stop the supply of electrical power to the aircraft. In other embodiments, the one or more power control inputs may include a feedback-based input signal received from the auxiliary power output 118. In an example, connection or disconnection of the auxiliary power output 118 to/from the aircraft may result in sending a power control input from the auxiliary power output 118 to the power management system 122.

The power production control module 124 may control the fuel cell system 110 to start production, adjust production, or stop production of electrical power in response to the one or more power control inputs. Based on the one or more power control inputs, the power production control module 124 may determine the amount of electrical power to be provided, and may control the fuel cell system 110 accordingly. The power production control module 124 may send a power control command to the fuel cell system 110.

For example, in response to the operator pressing the accelerator of the aircraft ground support vehicle 100, the power production control module may send a power control command to the fuel cell system to start production or increase production of electrical power. In response to the operator depressing the accelerator of the aircraft ground support vehicle 100, the power production control module may send a power control command to the fuel cell system to stop production or decrease production of electrical power. In another example, in response to the operator pressing a button associated with the auxiliary power output 118 to initiate distribution of power to the aircraft, the power production control module 124 may send a power control command to the fuel cell system 110 to start production or increase production of electrical power. In response to the operator pressing a button associated with the auxiliary power output 118 to stop distribution of power to the aircraft, the power production control module may send a power control command to the fuel cell system to stop production or decrease production of electrical power. In another example, in response to receiving a power control input from the auxiliary power output 118 regarding the connected state of the auxiliary power output from the aircraft, the power production control module may send a power control command to the fuel cell system to start production or increase production of electrical power. In response to receiving a power control input from the auxiliary power output 118 regarding the disconnected state of the auxiliary power output from the aircraft, the power production control module may send a power control command to the fuel cell system 110 to start production or increase production of electrical power.

In embodiments where the fuel source 112 includes a reformer, the power production control module 124 may send a power control command to the reformer to start production, adjust production, or stop production of fuel (e.g., hydrogen) in response to the one or more power control inputs. For example, the rate of generation of hydrogen fuel may be controlled in accordance with the fuel requirements of the fuel cell system 110. Hence, control of the reformer may be concurrent with control of the fuel cell system 110.

Electrical power produced by the fuel cell system 110 may be distributed to the traction system 104 (e.g., to the one or more motors 116) and/or the auxiliary power output 118 by the power distribution control module 126. Distribution of the electrical power by the power distribution control module 126 to the one or more motors 116 and/or the auxiliary power output 118 may be performed in accordance with the one or more power control inputs received at the power management system 122. For example, in response to the operator pressing the accelerator of the aircraft ground support vehicle 100, the power distribution control module 126 may distribute at least a portion of the electrical power received from the fuel cell system to the one or more motors 116. In another example, in response to the operator pressing a button associated with the auxiliary power output 118 to initiate distribution of power to the aircraft, the power distribution control module 126 may distribute at least a portion of the electrical power received from the fuel cell system to the auxiliary power output 118. In another example, in response to receiving a power control input from the auxiliary power output 118 regarding the connected state of the auxiliary power output from the aircraft, the power distribution control module 126 may distribute at least a portion of the electrical power received from the fuel cell system to the auxiliary power output 118.

Electrical power may be simultaneously distributed to the electrically traction system and/or the auxiliary power output 118. The portion of the electrical power produced by the fuel cell system 110 that is distributed to the one or more motors 116 and the auxiliary power output 118, respectively, may depend at least in part on the one or more power control inputs received at the power management system. For example, in response to the operator pressing the accelerator of the aircraft ground support vehicle 100, the power distribution control module 126 may distribute all of the electrical power provided by the fuel cell system 110 to the traction system if no power is presently being provided to the auxiliary power output 118. If power is presently being provided to the auxiliary power output 118, then the power distribution control module 126 may distribute a portion of the electrical power provided by the fuel cell system 110 to the traction system and another portion of the electrical power provided by the fuel cell system 110 to the auxiliary power output 118.

The power management system 122 of the present disclosure may perform ground-based aircraft movement, and may independently or simultaneously provide the aircraft with auxiliary power using a single fuel cell system 110. Accordingly, the aircraft ground support vehicle 100 may improve the efficiency of ground support operations, particularly those operations that conventionally require multiple aircraft ground support vehicles to complete, or that conventionally require the aircraft ground support vehicle to complete separately. The aircraft ground support vehicle 100 of the present disclosure may utilize the fuel cell system as the sole source of power to directly power the traction system 104 and to provide electrical power to the auxiliary power output 118. As described above, use of a fuel cell system to directly power the aircraft ground support vehicle 100 in its various operations provides advantages over battery powered electric aircraft ground support vehicles, such as theoretically unlimited on-demand power and fewer environmental concerns.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power management system of an aircraft ground support vehicle, comprising:
    a power production control module in communication with a fuel cell system of the aircraft ground support vehicle to control production of electrical power by the fuel cell system, the fuel cell system configured as a sole source of power to directly power a traction system of the aircraft ground support vehicle and an auxiliary power output of the aircraft ground support vehicle; and
    a power distribution control module in communication with the fuel cell system to control distribution of the electrical power between the traction system and the auxiliary power output.

2. An aircraft ground support vehicle, comprising:
    the power management system of claim 1;
    a chassis;
    the traction system mounted to the chassis and configured to drive the aircraft ground support vehicle;
    the auxiliary power output configured to couple to the auxiliary power input of an aircraft; and
    the fuel cell system fixedly mounted to the chassis and configured as the sole source of power to directly power the traction system and provide electrical power to the auxiliary power output.

3. The aircraft ground support vehicle of claim 2, wherein the power management system is configured to simultaneously distribute the electrical power produced by the fuel cell system between the traction system and the auxiliary power output.

4. The aircraft ground support vehicle of claim 2, wherein the power management system comprises a power production control module configured to control production of electrical power by the fuel cell system in response to one or more power control input signals received from an operator input or from the auxiliary power output.

5. The aircraft ground support vehicle of claim 2, wherein the power management system comprises a power distribution control module configured to distribute the electrical power produced by the fuel cell system to the traction system and to the auxiliary power output in response to one or more power control input signals received from an operator input or from the auxiliary power output.

6. The aircraft ground support vehicle of claim 2, wherein the fuel cell system comprises fuel cells combined in series and in parallel circuits.

7. The aircraft ground support vehicle of claim 2, further comprising a fuel source configured to supply fuel to the fuel cell system.

8. The aircraft ground support vehicle of claim 7, wherein the fuel source comprises a reformer configured to convert a hydrocarbon reactant to a fuel for use by the fuel cell system, the power management system further configured to control production of the fuel by the reformer.

9. The aircraft ground support vehicle of claim 2, wherein the auxiliary power output is configured to vary a voltage of electrical power output therefrom.

10. The aircraft ground support vehicle of claim 2, further comprising a reclamation system configured to capture waste products from the fuel cell system.

11. The aircraft ground support vehicle of claim 2, wherein the traction system comprises one or more wheels mounted to the chassis and one or more electric motors configured to drive the one or more wheels.

12. The power management system of claim 1, wherein the power management system is configured to simultaneously distribute the electrical power produced by the fuel cell system between the traction system and the auxiliary power output.

13. The power management system of claim 1, wherein the power production control module is configured to control production of electrical power by the fuel cell system in response to one or more power control input signals received from an operator input or from the auxiliary power output.

14. The power management system of claim 1, wherein the power distribution control module is configured to distribute the electrical power produced by the fuel cell system to the traction system and to the auxiliary power output in response to one or more power control input signals received from an operator input or from the auxiliary power output.

15. The power management system of claim 1, wherein the power production control module is in communication with a fuel source of the aircraft ground support vehicle, the fuel source comprising a reformer configured to convert a hydrocarbon reactant to a fuel for use by the fuel cell system, and wherein the power production control module is configured to control production of the fuel by the reformer.

16. A method of managing electrical power of an aircraft ground support vehicle, comprising:
    producing electrical power with a fuel cell system of the aircraft ground support vehicle, the fuel cell system configured as a sole source of electrical power to directly power a traction system of the aircraft ground support vehicle and an auxiliary power output of the aircraft ground support vehicle; and
    distributing the electrical power between the traction system and the auxiliary power output.

17. The method of claim 16, wherein the electrical power produced by the fuel cell system is simultaneously distributed between the traction system and the auxiliary power output.

18. The method of claim 16, wherein the production of electrical power by the fuel cell system is controlled in response to one or more power control input signals received from an operator input or from the auxiliary power output.

19. The method of claim 16, wherein the distribution of the electrical power produced by the fuel cell system to the traction system and to the auxiliary power output is controlled in response to one or more power control input signals received from an operator input or from the auxiliary power output.

20. The method of claim 16, further comprising converting a hydrocarbon reactant to a fuel for use by the fuel cell system using a reformer of the aircraft ground support vehicle.

* * * * *